W. R. FOWLER.
Attachment for Plows.

No. 200,047.  Patented Feb. 5, 1878.

WITNESSES:
W. W. Hollingsworth
Amos W. Hart

INVENTOR:
Wm. R. Fowler
BY
ATTORNEYS.

UNITED STATES PATENT OFFICE.

WILLIAM R. FOWLER, OF BALTIMORE, MARYLAND.

IMPROVEMENT IN ATTACHMENTS FOR PLOWS.

Specification forming part of Letters Patent No. 200,047, dated February 5, 1878; application filed September 18, 1877.

*To all whom it may concern:*

Be it known that I, WILLIAM R. FOWLER, of Baltimore city, State of Maryland, have invented a new and Improved Attachment for Plows; and I do hereby declare that the following is a full, clear, and exact description of the same.

The invention relates to an attachment for plows, which is in the nature of combined rake and scraper or leveler for the upturned furrow-slice.

The device consists, generally stated, of a curved arm or bar, hinged to the plow-beam by detachable and adjustable clamps, and carrying a rake and scraper or furrow-smoothing board.

Figure 1:
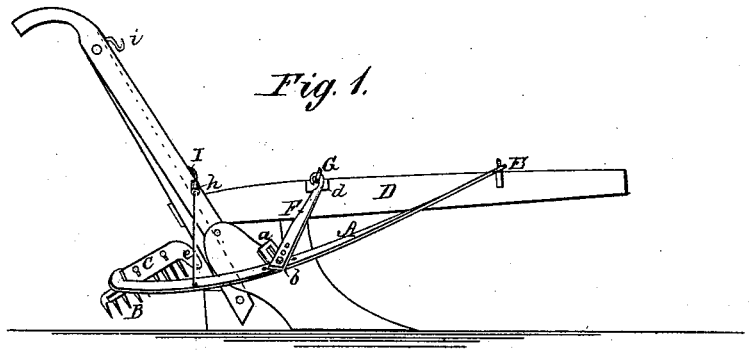
Figure 2:
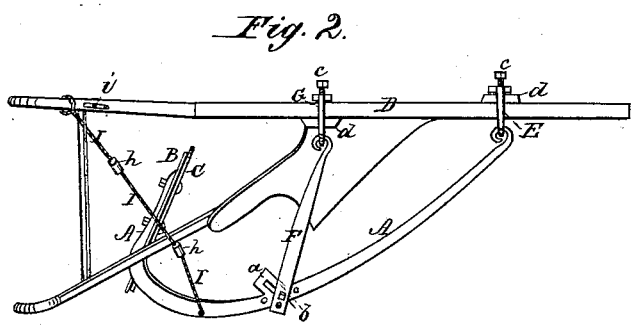
Figure 3:
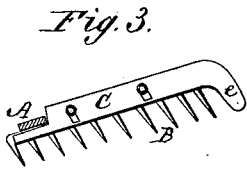
Figure 4:

In the accompanying drawing, forming part of this specification, Figure 1 is a side elevation, and Fig. 2 a plan view, of a plow and my improved attachment applied thereto. Figs. 3 and 4 are details.

The bar A, to whose curved rear end the rake B and scraper or smoothing-board C are attached, is pivoted to the plow-beam D at its forward end by means of a clamp, E. A brace or stay-bar, F, is also attached to the plow-beam, in rear of its middle, by a similar clamp, G, and adjustably connected with the arm A by means of a slot and screw-bolt, $a\ b$, as shown. This mode of attaching the bar A to the plow-beam enables it to be adjusted nearer to or farther from the mold-board, as required by the condition or quality of the soil, and the effect it is desired to produce thereon. The clamps may likewise be attached to plow-beams of various forms and sizes, so that the attachment may be used on different plows. The clamps are secured by screws $c$, and in case the beam is very thin, wooden blocks $d$ may be inserted, as shown, to enable them to be properly secured.

The rake-teeth are longer on the inner end of the rake-head, to enable them to work deepest on the inner edge of the furrow-slice. Both the rake and smoothing-board are detachably secured to the bent end of the arm A, in order that the latter may be used on either side of the plow-beam with a right or left hand mold-board.

The smoothing-board may be adjusted higher or lower, to govern the depth to which the rake-teeth shall enter the soil, by means of screw-bolts which pass through slots in the rake-head.

The smoothing-board is provided with a prong or pendent arm, $e$, on its inner end, whose function is to assist the mold-board in turning the furrow-slice; also to smooth and stay the wall of the furrow, and prevent the soil falling back into it.

The rake B harrows the upturned side of the furrow-slice, breaks the clods, loosens the soil, and materially assists in disintegrating and destroying the sod.

The smoothing-board C cuts into the soil, scrapes and shaves off the portion loosened by the rake, and moves it laterally into the space between the furrow-slices, thus leaving the surface as nearly level as practicable.

The smoothing-board may be used without the rake for covering corn, leveling the soil thrown on the seed, &c.

The attachment is also available for digging potatoes, by detaching both the rake and smoothing-board, and substituting a rake, Fig. 4, having curved or claw-like teeth.

The brace F enables the rake to be set laterally at any required angle or distance from the mold-board.

The attachment may be raised and supported out of the way, when not required for use, or when turning at the ends of the furrows, by means of a cord, I, having wooden or other blocks, $h$, attached, which serve to prevent the cord drawing through the hook $i$, attached to the near handle.

What I claim is—

1. The improved plow attachment consisting of the detachable adjustable clamps E G, the curved pivoted bar A, the brace or stay-bar F, and the rake and scraper attached to the bent arm of the bar A, as shown and described, for the purpose specified.

2. The adjustable scraper or smoothing-board and the rake, combined with the pivoted arm A, as shown and described.

WILLIAM R. FOWLER.

Witnesses:
WM. L. HANSE,
GEO. R. JEFFERIES.